United States Patent
Jang et al.

(10) Patent No.: US 10,854,886 B2
(45) Date of Patent: *Dec. 1, 2020

(54) METHOD FOR PREPARING A CARBON-SUPPORTED, PLATINUM-COBALT ALLOY, NANOPARTICLE CATALYST

(71) Applicant: KOREA INSTITUTE OF SCIENCE AND TECHNOLOGY, Seoul (KR)

(72) Inventors: Jong Hyun Jang, Seoul (KR); Hee-Young Park, Seoul (KR); Jea-woo Jung, Seoul (KR); Hyoung-Juhn Kim, Seoul (KR); Dirk Henkensmeier, Seoul (KR); Sung Jong Yoo, Seoul (KR); Jin Young Kim, Seoul (KR); So Young Lee, Seoul (KR); Hyun Seo Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 11 days.

This patent is subject to a terminal disclaimer.

(21) Appl. No.: 16/268,856

(22) Filed: Feb. 6, 2019

(65) Prior Publication Data
US 2019/0341624 A1  Nov. 7, 2019

(30) Foreign Application Priority Data
May 2, 2018  (KR) .................. 10-2018-0050625

(51) Int. Cl.
*H01M 4/92*  (2006.01)
(52) U.S. Cl.
CPC ........... *H01M 4/921* (2013.01); *H01M 4/926* (2013.01)
(58) Field of Classification Search
CPC ........ H01M 4/921; H01M 4/926; B01J 23/42
See application file for complete search history.

(56) References Cited

U.S. PATENT DOCUMENTS 4,794,054 A * 12/1988 Ito .................. B01J 23/8913
  429/524
7,037,873 B2 * 5/2006 Kato .................... H01M 4/921
  429/483

(Continued)

FOREIGN PATENT DOCUMENTS

| KR | 10-0868756 B1 | 11/2008 |
| KR | 10-1028016 B1 | 4/2011 |
| KR | 10-1488827 B1 | 2/2015 |

OTHER PUBLICATIONS

Liu, H., Li, C., Chen, D. et al. Uniformly dispersed platinum-cobalt alloy nanoparticles with stable compositions on carbon substrates for methanol oxidation reaction. Sci Rep 7, 11421 (2017). https://doi.org/10.1038/s41598-017-10223-2 (Year: 2017).*

(Continued)

*Primary Examiner* — Coris Fung
*Assistant Examiner* — Umer Akhtar
(74) *Attorney, Agent, or Firm* — Rabin & Berdo, P.C.

(57) ABSTRACT

A method for preparing a carbon-supported, platinum-cobalt alloy, nanoparticle catalyst includes mixing a solution containing, in combination, a platinum precursor, a transition metal precursor consisting of a transition metal that is cobalt, carbon, a stabilizer that is oleyl amine, and a reducing agent that is sodium borohydride to provide carbon-supported, platinum-cobalt alloy nanoparticles, and washing the carbon-supported, platinum-cobalt alloy, nanoparticles using ethanol and distilled water individually or in combination followed by drying at room temperature to obtain dried carbon-supported, platinum-cobalt alloy, nanoparticles; treating the dried carbon-supported, platinum-cobalt alloy, nanoparticles with an acetic acid solution having a concentration ranging from 1-16M to provide acetic acid-treated nanoparticles, and washing the acetic acid-treated nanoparticles using distilled water followed by drying at room (Continued)

temperature to obtain dried acetic acid-treated nanoparticles; and heat treating the dried acetic acid-treated nanoparticles at a temperature ranging from 600 to 1000° C. under a hydrogen-containing atmosphere.

1 Claim, 6 Drawing Sheets

(56) References Cited

U.S. PATENT DOCUMENTS

| | | | | |
|---|---|---|---|---|
| 8,859,458 | B2* | 10/2014 | Hwang | B82Y 30/00 |
| | | | | 429/487 |
| 2013/0150235 | A1* | 6/2013 | Roh | H01M 4/921 |
| | | | | 502/185 |
| 2016/0301083 | A1* | 10/2016 | Arai | H01M 4/8828 |
| 2018/0006313 | A1* | 1/2018 | Haas | B01J 21/18 |

OTHER PUBLICATIONS

Kug-Seung Lee et al., "Effect of oleylamine concentration on the structure and oxygen reduction activity of carbon-supported surface-Pt-enriched $Pt_3Au$ electrocatalysts", Journal of Power Sources, 2015, pp. 130-135, vol. 290.

Binghong Han et al., "Record activity and stability of dealloyed bimetallic catalysts for proton exchange membrane fuel cells", Energy & Environmental Science, 2015, pp. 258-266, vol. 8.

\* cited by examiner

METHOD FOR PREPARING A CARBON-SUPPORTED, PLATINUM-COBALT ALLOY, NANOPARTICLE CATALYST

CROSS-REFERENCE TO RELATED APPLICATIONS

This application claims, under 35 U.S.C. § 119, the priority of Korean Patent Application No. 10-2018-0050625 filed on May 2, 2018 in the Korean Intellectual Property Office, the disclosure of which is incorporated herein by reference in its entirety.

BACKGROUND OF THE INVENTION

1. Field of the Invention

The following disclosure relates to a method for preparing a carbon-supported platinum-transition metal alloy nanoparticle catalyst. More particularly, the following disclosure relates to a method for preparing a carbon-supported platinum-transition metal alloy nanoparticle catalyst by using a stabilizer, wherein the transition metal and the stabilizer on the surface of the nanoparticles are removed simultaneously through treatment with acetic acid to obtain the carbon-supported platinum-transition metal alloy nanoparticle catalyst through a more simple and eco-friendly process as compared to the related art and to apply the catalyst as a catalyst for a fuel cell having high performance and high durability.

2. Background of the Related Art

A carbon-supported platinum-transition metal alloy nanoparticle catalyst has been used frequently as a high-performance catalyst for a fuel cell. However, transition metal in the alloy catalyst may be dissolved out under the operating condition of a fuel cell to cause degradation of the performance. This has been regarded as a serious technical problem.

According to the related art, to solve the above-mentioned problem, there has been reported a method for dissolving the transition metal on the surface of alloy nanoparticles by using a strong acid, such as sulfuric acid or nitric acid, thereby improving the stability.

Meanwhile, a stabilizer is used for preparing a nanoparticle catalyst. The stabilizer is adsorbed to the surface of the catalyst and adversely affects the catalytic performance. Thus, a process for removing the stabilizer is required essentially. In general, the stabilizer may be removed through heat treatment in the air (Non-Patent Document 1).

Therefore, according to the related art, the following four steps are carried out to obtain a highly durable fuel cell catalyst including a carbon-supported platinum-transition metal catalyst: 1) forming carbon-supported platinum-transition metal alloy nanoparticles by using a stabilizer; 2) carrying out heat treatment in the air to remove the stabilizer; 3) carrying out heat treatment under hydrogen atmosphere to reduce the surface of the particles; and 4) dissolving the transition metal by using a strong acid to obtain a catalyst (Non-Patent Document 2).

However, the above-mentioned method according to the related art includes complicated processes and uses a strong acid, and thus shows problems, such as environmental pollution or risks during the process.

Therefore, the inventors of the present disclosure have found that a carbon-supported, platinum-transition metal alloy, nanoparticle catalyst is obtained through a more simple and eco-friendly process as compared to the related art by removing the transition metal and the stabilizer on the surface of the nanoparticles simultaneously through treatment with acetic acid, in a method for preparing a carbon-supported platinum-transition metal alloy nanoparticle catalyst by using a stabilizer, and the catalyst may be used as a catalyst for a fuel cell having high performance and high durability. The present disclosure is based on this finding.

PRIOR ART REFERENCES

Non-Patent Document 1: J. Power Sources, 290 (2015) 130-135; and
Non-Patent Document 2: Energy Environ. Sci., 8 (2015) 258-266.

SUMMARY OF THE INVENTION

The present disclosure is designed to solve the problems of the related art, and an embodiment of the present disclosure is directed to providing a method for preparing a carbon-supported, platinum-transition metal alloy, nanoparticle catalyst by using a stabilizer, wherein the transition metal and the stabilizer on the surface of the nanoparticles are removed simultaneously through treatment with acetic acid to obtain the carbon-supported, platinum-transition metal alloy, nanoparticle catalyst through a more simple and eco-friendly process as compared to the related art, and to apply the catalyst as a catalyst for a fuel cell having high performance and high durability.

In one aspect of the present disclosure, there is provided a method for preparing a carbon-supported, platinum-transition metal alloy, nanoparticle catalyst, including the steps of: (a) mixing a platinum precursor, a transition metal precursor, carbon, a stabilizer and a reducing agent solution, and carrying out washing and drying to obtain carbon-supported, platinum-transition metal alloy, nanoparticles; (b) mixing the carbon-supported, platinum-transition metal alloy, nanoparticles with an acetic acid solution, and carrying out washing and drying to obtain acetic acid-treated nanoparticles; and (c) heat treating the acetic acid-treated nanoparticles.

In another aspect of the present disclosure, there is provided a carbon-supported, platinum-transition metal alloy, nanoparticle catalyst obtained by the above-mentioned method.

In still another aspect of the present disclosure, there is provided an electric device including the carbon-supported, platinum-transition metal alloy, nanoparticle catalyst according to the present disclosure, the electric device being any one device selected from electric vehicles, hybrid electric vehicles, plug-in hybrid electric vehicles and power storage systems.

According to the present disclosure, a carbon-supported, platinum-transition metal alloy, nanoparticle catalyst is obtained through a more simple and eco-friendly process as compared to the related art by removing the transition metal and the stabilizer on the surface of the nanoparticles simultaneously through treatment with acetic acid, in a process for preparing a carbon-supported, platinum-transition metal alloy, nanoparticle catalyst by using a stabilizer, and the catalyst may be used as a catalyst for a fuel cell having high performance and high durability.

DETAILED DESCRIPTION OF THE INVENTION

Figure 1:
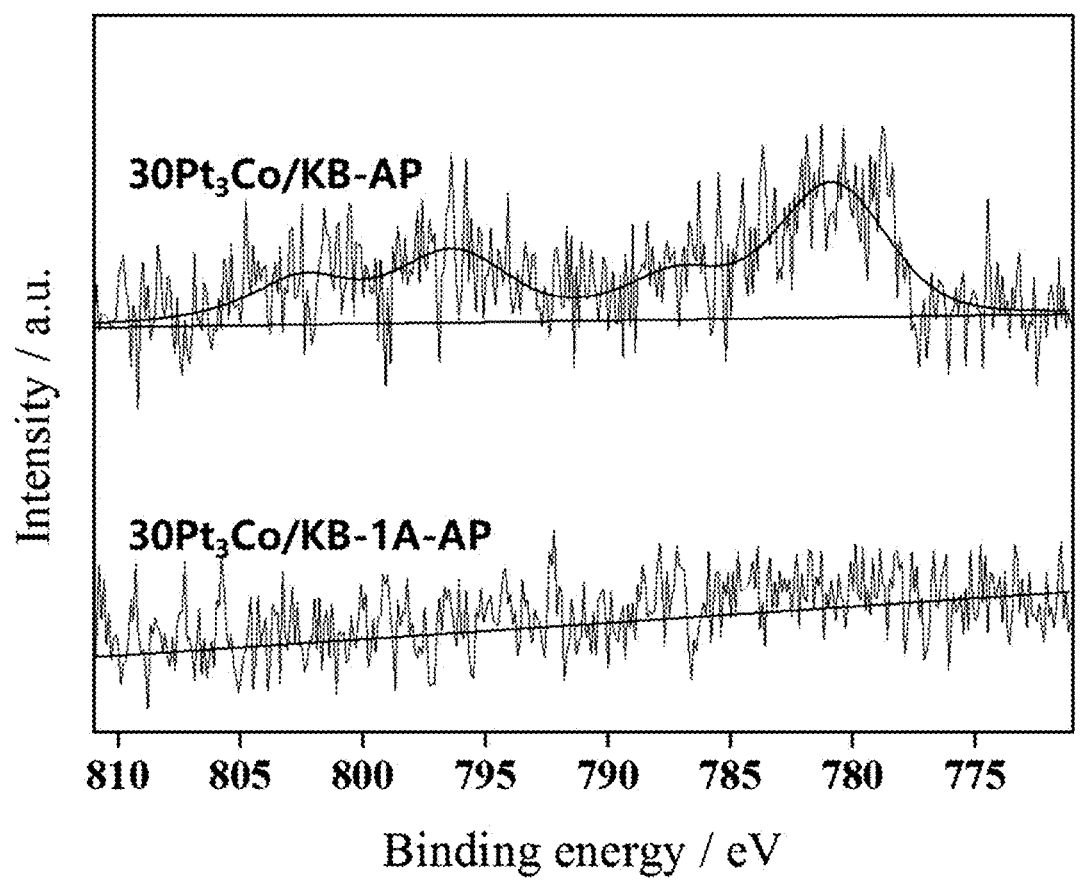
FIG. 1 shows a Co 2p X-ray photoelectron spectroscopic (XPS) spectrum of a carbon-supported, platinum-transition metal alloy, nanoparticle catalyst obtained from Example 1, before and after treatment with acetic acid, i.e., before treatment with acetic acid: 30Pt$_3$Co/KB-AP, which is KETJENBLACK-AP, a carbon material manufactured by AkzoNobel, after treatment with acetic acid: 30Pt$_3$Co/KB-1A-AP.

Hereinafter, various aspects and embodiments of the present disclosure will be explained in more detail.

In one aspect of the present disclosure, there is provided a method for preparing a carbon-supported, platinum-transition metal alloy, nanoparticle catalyst, including the steps of: (a) mixing a platinum precursor, a transition metal precursor, carbon, a stabilizer and a reducing agent in a solution, and carrying out washing and drying to obtain carbon-supported, platinum-transition metal alloy, nanoparticles; (b) mixing the carbon-supported, platinum-transition metal alloy, nanoparticles with an acetic acid solution, and carrying out washing and drying to obtain acetic acid-treated nanoparticles; and (c) heat treating the acetic acid-treated nanoparticles.

According to an embodiment, the transition metal may be at least one transition metal selected from cobalt, palladium, osmium, ruthenium, gallium, titanium, vanadium, chromium, manganese, iron, nickel, copper and zinc, but is not limited thereto. Preferably, cobalt may be used.

According to another embodiment, the stabilizer may be at least one material selected from oleyl amine, octyl amine, hexadecyl amine, octadecyl amine, trialkyl phosphine, oleic acid, lauric acid, linoleic acid, erucic acid and dodecyl acid, but is not limited thereto. Preferably, oleyl amine may be used.

According to still another embodiment, the reducing agent may be at least one material selected from boron hydrides, such as sodium borohydride, lithium borohydride and lithium triethylborohydride; alcohols, such as ethylene glycol, diethylene glycol, triethylene glycol, tetraethylene glycol, dirpropylene glycol, propanediol and Ibutanediol; and aldehydes, such as formaldehyde, but is not limited thereto. Preferably, sodium borohydride may be used.

According to still another embodiment, the acetic acid may have a concentration of 1-16M, preferably 1-10M, and more preferably 1-5M.

In the process for preparing a carbon-supported, platinum-transition metal alloy, nanoparticle catalyst according to the related art, both a step of removing the stabilizer through heat treatment and a step of dissolving the transition metal on the surface of alloy nanoparticles with a strong acid are carried out. On the contrary, in the method according to the present disclosure, it is possible to remove the stabilizer and the transition metal on the surface of alloy nanoparticles simultaneously through treatment with acetic acid. Thus, it is possible to obtain a carbon-supported, platinum-transition metal alloy, nanoparticle catalyst in a more simple and eco-friendly process as compared to the process according to the related art.

According to still another embodiment, in step (a) or (b), washing may be carried out by using ethanol, distilled water and a combination thereof, but is not limited thereto. Preferably, ethanol and distilled water may be used in step (a), and distilled water may be used in step (b).

According to still another embodiment, in steps (a) and (b), drying may be carried out at room temperature.

According to still another embodiment, in step (c), heat treatment may be carried out at 600-1000° C., preferably 700-900° C., and more preferably 750-850° C., under hydrogen atmosphere.

Particularly, although there is no clear description in the following Examples and Comparative Examples, the type of stabilizer, the type of reducing agent, the concentration of acetic acid, the washing solvent in step (a) or (b), the drying conditions in steps (a) and (b), and the heat treatment condition in step (c) were varied in the method for preparing a carbon-supported, platinum-transition metal alloy, nanoparticle catalyst according to the present disclosure to obtain different carbon-supported, platinum-transition metal alloy, nanoparticle catalysts. Then, the shapes of the resultant catalysts were determined through transmission electron microscopy (TEM). In addition, the positive electrodes to which the resultant catalysts are applied were used for fuel cells, and charging/discharging was carried out 300 times to determine loss for each of the catalysts applied to the positive electrodes.

As a result, unlike the other conditions and the other numerical ranges, when all of the following conditions are satisfied, the platinum-transition metal alloy, nanoparticles maintained a significantly small particle size of 3-5 nm even after the heat treatment of step (c), similarly to the particle size before the heat treatment. In addition, even after carrying out charging/discharging 300 times, it was shown that no loss for the catalysts applied to the positive electrodes was observed:

(i) the transition metal is cobalt,
(ii) the stabilizer is oleyl amine,
(iii) the reducing agent is sodium borohydride,
(iv) the concentration of acetic acid is 1-16M,
(v) the washing in step (a) is carried out by using ethanol and distilled water,
(vi) the washing in step (b) is carried out by using distilled water,
(vii) the drying in steps (a) and (b) is carried out at room temperature, and
(viii) the heat treatment in step (c) is carried out at 600-1000° C. under hydrogen atmosphere.

However, when any one of the above conditions is not satisfied, the platinum-transition metal alloy, nanoparticles cause a significant increase in particle size to 10 nm or more after the heat treatment of step (c), as compared to the particle size before the heat treatment. In addition, after charging/discharging is carried out 300 times, it is observed that the catalysts applied to the positive electrodes show a significant loss.

In another aspect of the present disclosure, there is provided a carbon-supported, platinum-transition metal alloy, nanoparticle catalyst obtained by the method according to the present disclosure.

According to an embodiment, the carbon-supported, platinum-transition metal alloy, nanoparticle catalyst may be a positive electrode catalyst for a fuel cell.

In still another aspect of the present disclosure, there is provided an electric device including the carbon-supported, platinum-transition metal alloy, nanoparticle catalyst according to the present disclosure, the electric device being any one device selected from electric vehicles, hybrid electric vehicles, plug-in hybrid electric vehicles and power storage systems.

Exemplary embodiments now will be described more fully hereinafter with reference to the accompanying drawings, in which exemplary embodiments are shown.

Example 1

A platinum precursor, cobalt precursor, oleyl amine and carbon were dispersed in dry ethanol and a reducing agent solution containing 0.23 g of sodium borohydride dissolved in 10 mL of dry ethanol was introduced to the dispersed solution. After carrying out agitation for 12 hours, washing was carried out by using ethanol and distilled water, and the resultant product was dried at room temperature to obtain carbon-supported platinum-cobalt alloy nanoparticles ($Pt_3Co$/KB-AP, which is KETJENBLACK-AP, a carbon material manufactured by AkzoNobel. The carbon-supported platinum-cobalt alloy nanoparticles were dispersed in 1M acetic acid solution. Then, the resultant solution was agitated for 12 hours, washed with distilled water, and dried at room temperature to obtain acetic acid-treated nanoparticles ($Pt_3Co$/KB-1A-AP), where "KB-1A-AP" identifies KETJENBLACK-AP, a carbon material manufactured by AkzoNobel, after the acetic acid treatment described above. The acetic acid-treated nanoparticles were heat treated at 800° C. under a 5% hydrogen atmosphere to obtain acetic acid-treated carbon-supported platinum-cobalt alloy nanoparticle catalyst ($Pt_3Co$/KB-1A-H800), where "KB-1A-H800" identifies KB-1A-AP described above after heat treatment at 800° C. under a 5% hydrogen atmosphere.

Example 2

The acetic acid-treated carbon-supported platinum-cobalt alloy nanoparticle catalyst according to Example 1 was used as a negative electrode catalyst to obtain a membrane electrode assembly (MEA) for a fuel cell. A mixture of $Pt_3Co$/KB-1A-H800 according to Example 1, 5 wt % NAFION (a perfluorinated polymer manufactured by Sigma-Aldrich)) solution and isopropyl alcohol (IPA) were used to form a catalyst slurry, and the catalyst slurry was applied to a NAFION 211 (a perfluorinated membrane manufactured by Sigma-Aldrich) electrolyte by using an air sprayer to obtain a negative electrode. In the same manner, a commercially available carbon-supported, platinum catalyst (Pt/C) was used instead of $Pt_3Co$/KB-1A-H800 to obtain a positive electrode and to manufacture an MEA.

Comparative Example 1

A commercially available carbon-supported, platinum catalyst (Pt/C) was prepared.

Comparative Example 2

A membrane electrode assembly (MEA) was obtained in the same manner as described in Example 2, except that the commercially available carbon-supported platinum catalyst according to Comparative Example 1 was used not only for a positive electrode but also for a negative electrode, instead of the catalyst according to Example 1.

FIG. 1 shows Co 2p X-ray photoelectron spectroscopic (XPS) spectrum of the carbon-supported, platinum-transition metal alloy, nanoparticle catalyst obtained from Example 1, before and after treatment with acetic acid, i.e., before treatment with acetic acid: $30Pt_3Co$/KB-AP, after treatment with acetic acid: $30Pt_3Co$/KB)-1A-AP.

Referring to FIG. 1, cobalt oxide is present on the surface of the alloy nanoparticles before the treatment with acetic acid. On the contrary, it can be seen that cobalt on the surface of the alloy nanoparticles is removed after the treatment with 1M acetic acid.

Figure 2A:
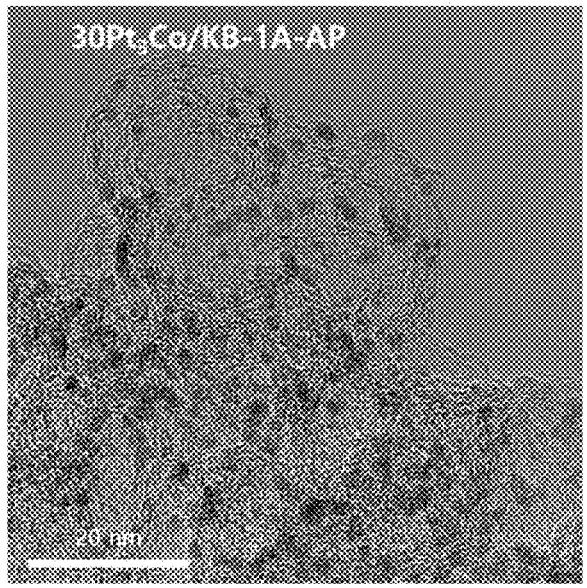
FIGS. 2A and 2B show a transmission electron microscopic (TEM) image of the carbon-supported, platinum-transition metal alloy, nanoparticle catalyst obtained from Example 1, before heat treatment in FIG. 2A and after heat treatment in FIG. 2B.
Figure 2B:
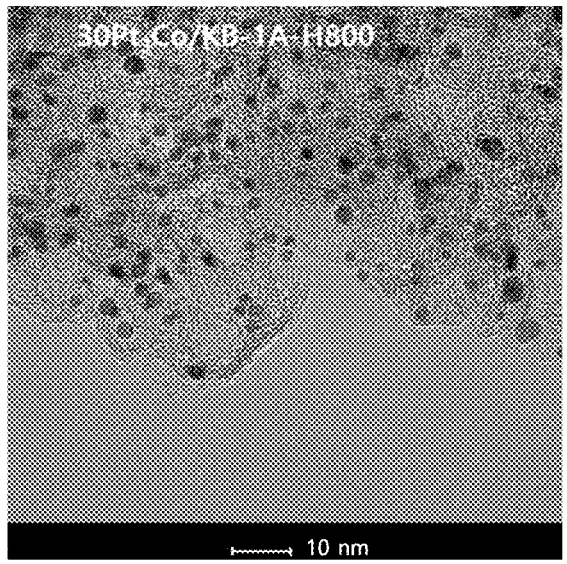

FIGS. 2A and 2B show transmission electron microscopic (TEM) image of a carbon-supported, platinum-transition metal alloy, nanoparticle catalyst obtained from Example 1, before heat treatment in FIG. 2A and after heat treatment in FIG. 2B.

Referring to FIG. 2A, it can be seen that particles having a size of about 3 nm are dispersed in a carbon support in the catalyst before heat treatment.

In addition, referring to FIG. 2B, it can be seen that the catalyst after heat treatment maintains a significantly small particle size of 3-5 nm even though heat treatment is carried out at a high temperature of 800° C.

Figure 3A:
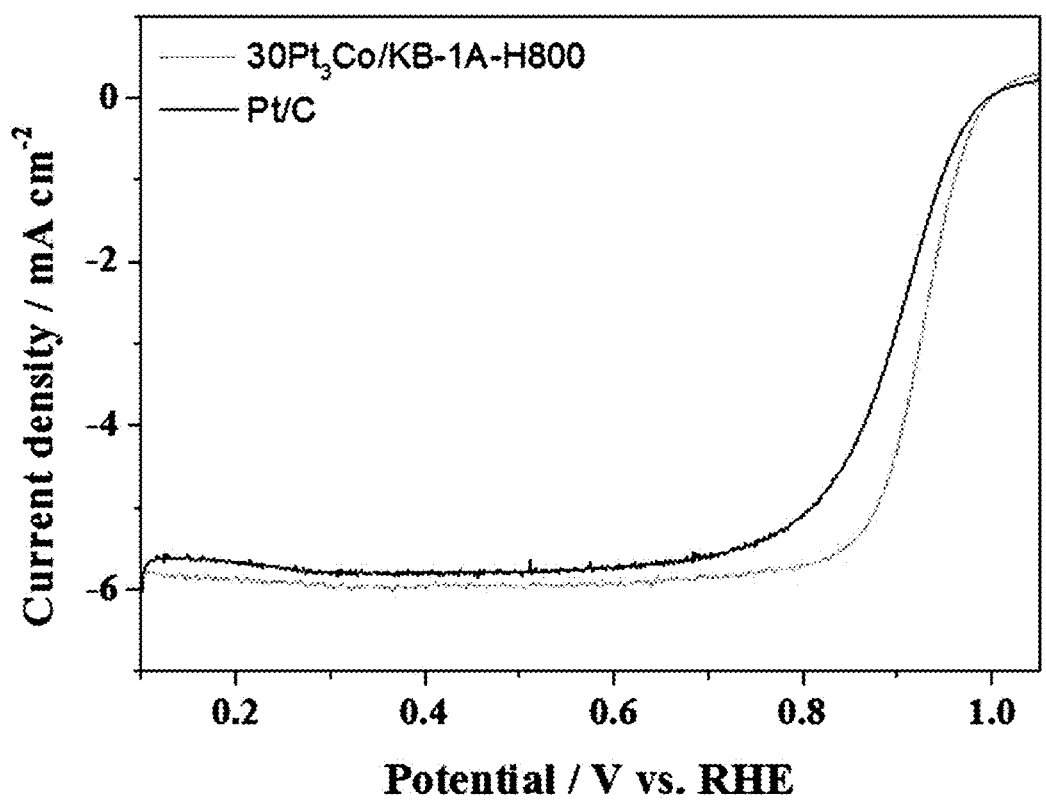
FIG. 3A shows an oxygen reduction, polarization curve
Figure 3B:
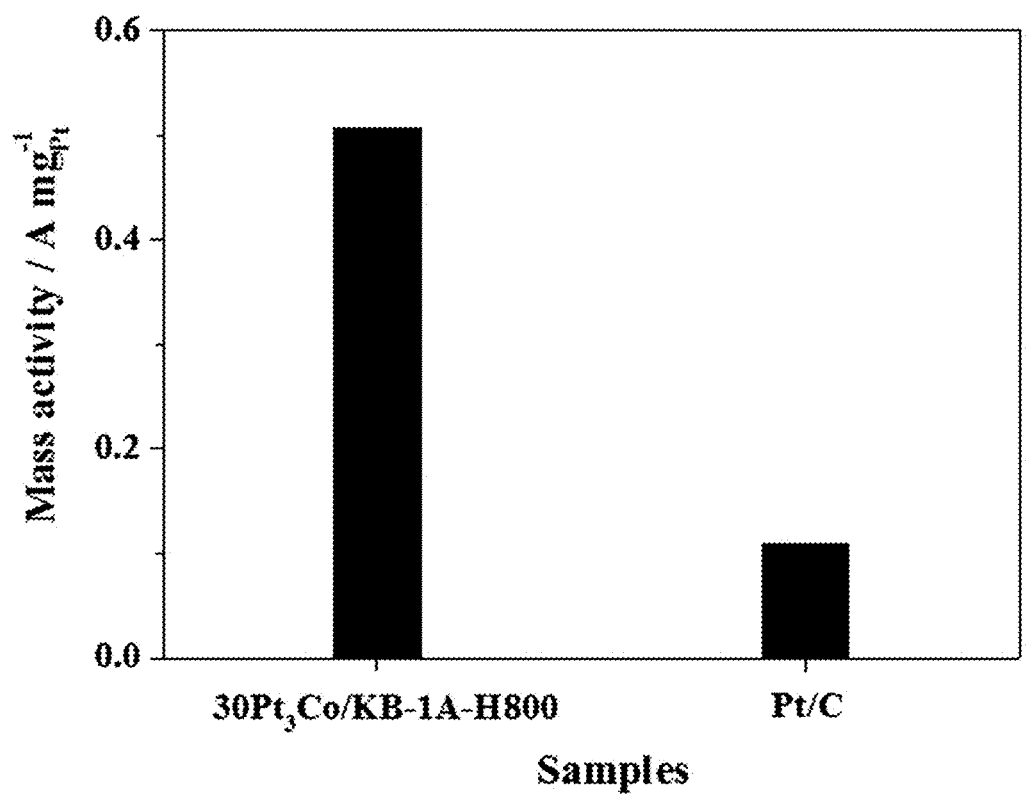
FIG. 3B shows a graph illustrating the catalytic performance per weight of platinum for the carbon-supported, platinum-transition metal alloy, nanoparticle catalyst obtained from Example 1 and the commercially-available, carbon-supported, platinum catalyst (Pt/C) according to Comparative Example 1.

FIG. 3A shows an oxygen reduction polarization curve and FIG. 3B shows a graph illustrating the catalytic performance per weight of platinum, for the carbon-supported, platinum-transition metal alloy, nanoparticle catalyst obtained from Example 1 and the commercially available carbon-supported platinum catalyst (Pt/C) according to Comparative Example 1.

Referring to FIG. 3A, it can be seen from the polarization curve that the alloy nanoparticle catalyst according to the present disclosure has higher performance as compared to a commercially-available, carbon-supported, platinum catalyst.

In addition, referring to FIG. 3B, it can be seen that the alloy nanoparticle catalyst according to the present disclosure shows performance approximately 4.8 times higher than the performance of the commercially-available, carbon-supported, platinum catalyst.

Figure 4:
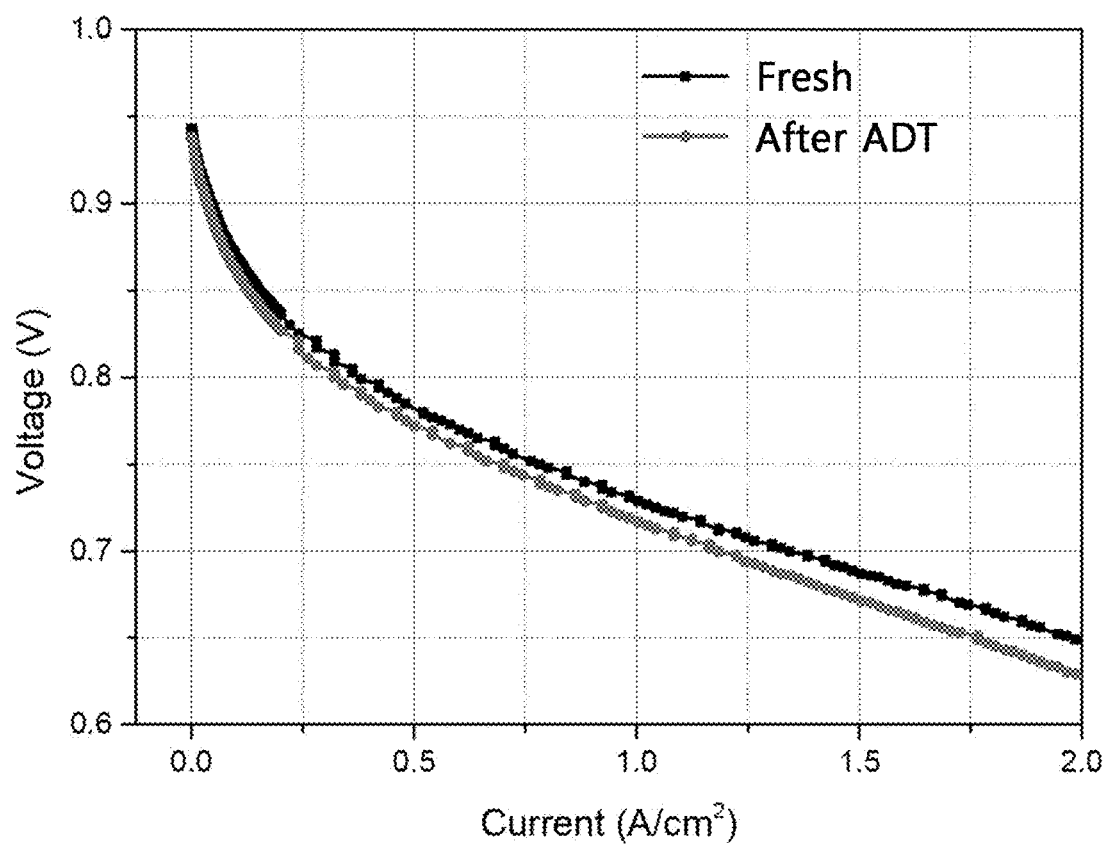
FIG. 4 is a graph illustrating the polarization curve of a fuel cell using the membrane electrolyte assembly (MEA) obtained from Example 2 before (black color)/after (red color) an accelerated deterioration test.
Figure 5:
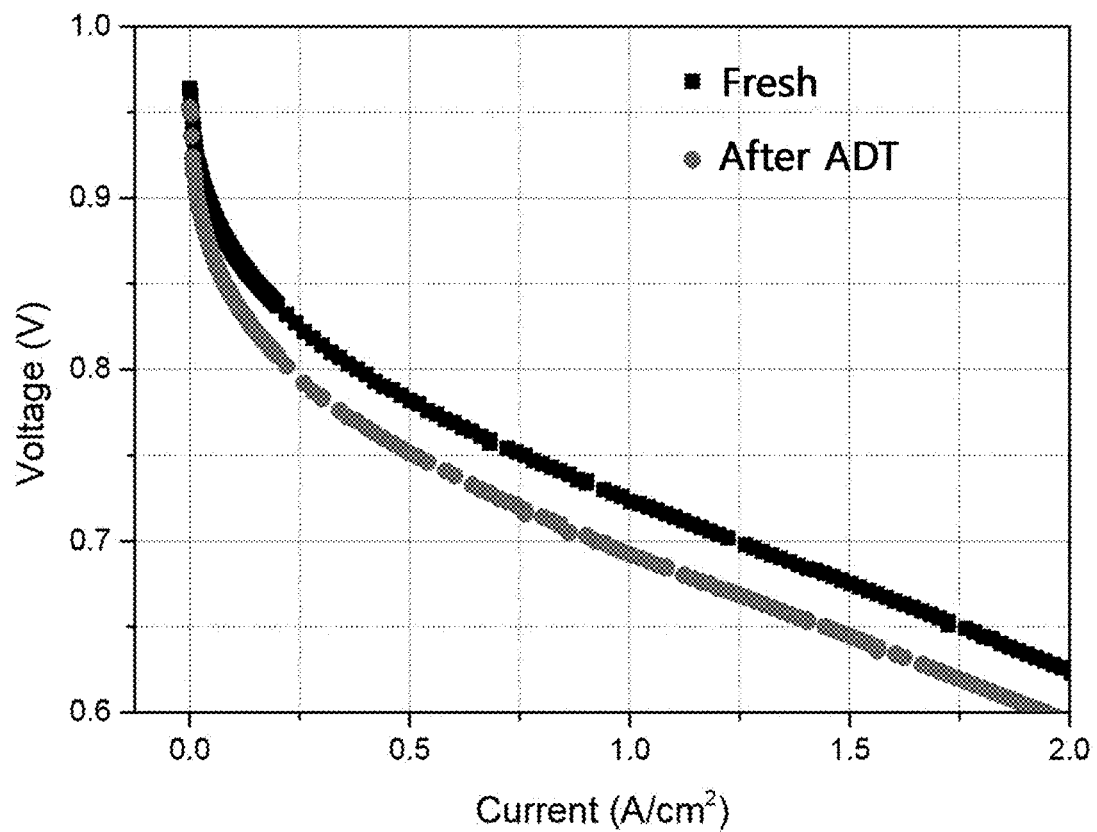
FIG. 5 is a graph illustrating the polarization curve of the fuel cell using the MEA of Comparative Example 2 before (black color)/after (red color) an accelerated deterioration test.

FIG. 4 is a graph illustrating the polarization curve of the fuel cell using the membrane electrolyte assembly (MEA) obtained from Example 2 before (black color)/after (red color) an accelerated deterioration test. FIG. 5 is a graph illustrating the polarization curve of the fuel cell using the MEA of Comparative Example 2 before (black color)/after (red color) an accelerated deterioration test.

An accelerated deterioration test was carried out through 30,000 times of cyclic voltammetry in a cell voltage range of 0.6-1.0V according to the accelerated deterioration condition of a catalyst defined by United States Department of Energy.

Referring to FIG. 4 and FIG. 5, after the accelerated deterioration test, the fuel cell using the MEA according to Example 2 shows a decrease in current density of 10.3% at 0.76V (FIG. 4). This demonstrates that the fuel cell has higher durability corresponding to 29.9% based on the fuel cell using the MEA according to Comparative Example 2 which shows a decrease in current density of 34.5% under the same condition (FIG. 5).

Therefore, according to the present disclosure, a carbon-supported, platinum-transition metal alloy, nanoparticle catalyst is obtained through a more simple and eco-friendly process as compared to the related art by removing the transition metal and the stabilizer on the surface of the nanoparticles simultaneously through treatment with acetic acid, and the catalyst may be used as a catalyst for a fuel cell having high performance and high durability.

What is claimed is:

1. A method for preparing a carbon-supported, platinum-cobalt alloy, nanoparticle catalyst, comprising the steps of:
    (a) mixing a solution containing, in combination, a platinum precursor, a transition metal precursor consisting of a transition metal that is cobalt, carbon, a stabilizer that is oleyl amine, and a reducing agent that is sodium borohydride to provide carbon-supported, platinum-cobalt alloy, nanoparticles, and washing the carbon-supported, platinum-cobalt alloy, nanoparticles using ethanol and distilled water individually or in combination followed by drying at room temperature to obtain dried carbon-supported, platinum-cobalt alloy, nanoparticles;
    (b) treating the dried carbon-supported, platinum-cobalt alloy, nanoparticles with an acetic acid solution having a concentration ranging from 1-16M to provide acetic acid-treated nanoparticles, and washing the acetic-acid nanoparticles using distilled water followed by drying at room temperature to obtain dried acetic acid-treated nanoparticles; and
    (c) heat treating the dried acetic acid-treated nanoparticles at a temperature ranging from 600 to 1000° C. under a hydrogen-containing atmosphere.

* * * * *